Jan. 10, 1939. V. W. TODD 2,143,117
CONVEYER
Filed March 9, 1937 3 Sheets-Sheet 1
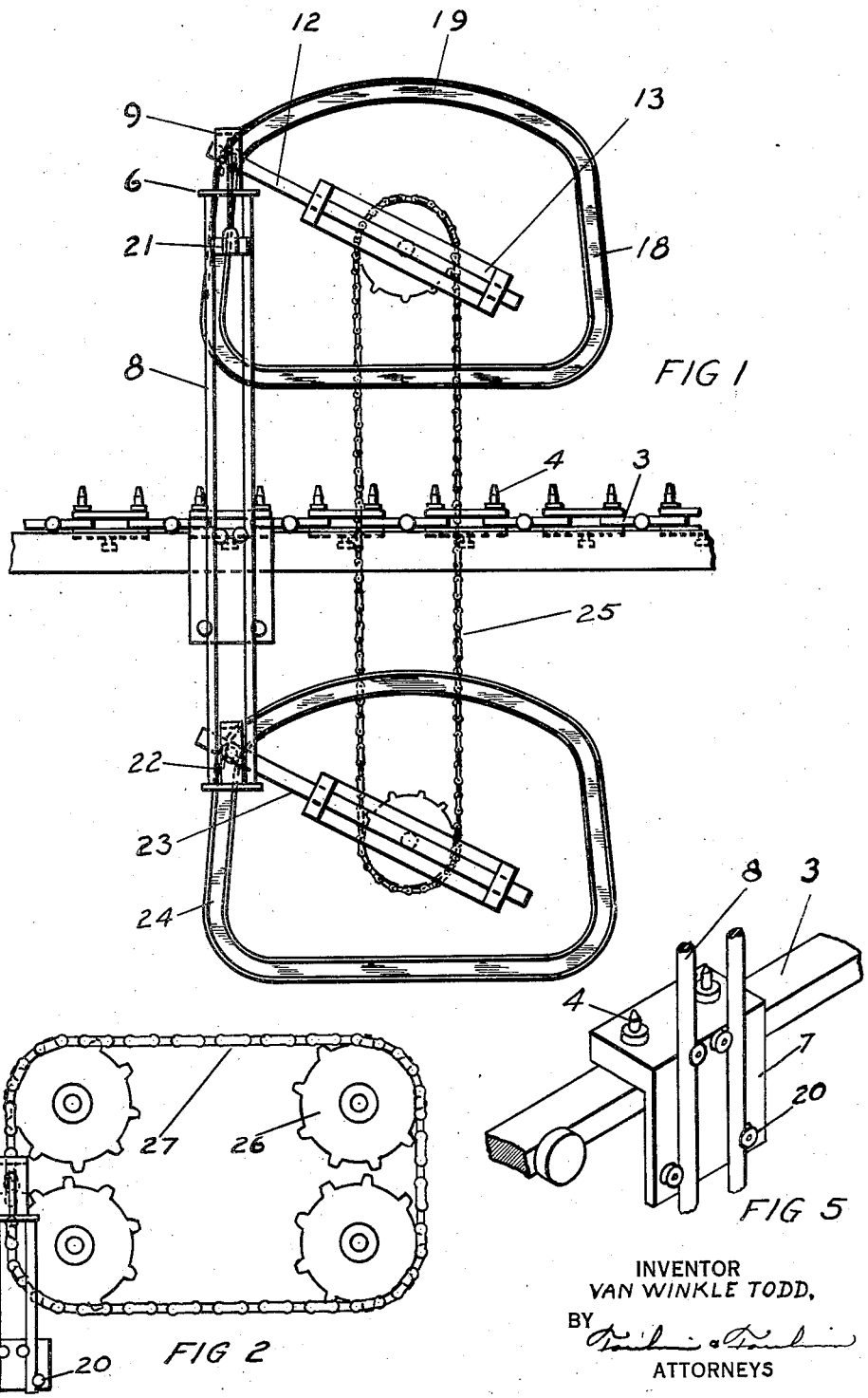
INVENTOR
VAN WINKLE TODD,
BY
ATTORNEYS

INVENTOR
VAN WINKLE TODD,
BY
ATTORNEYS

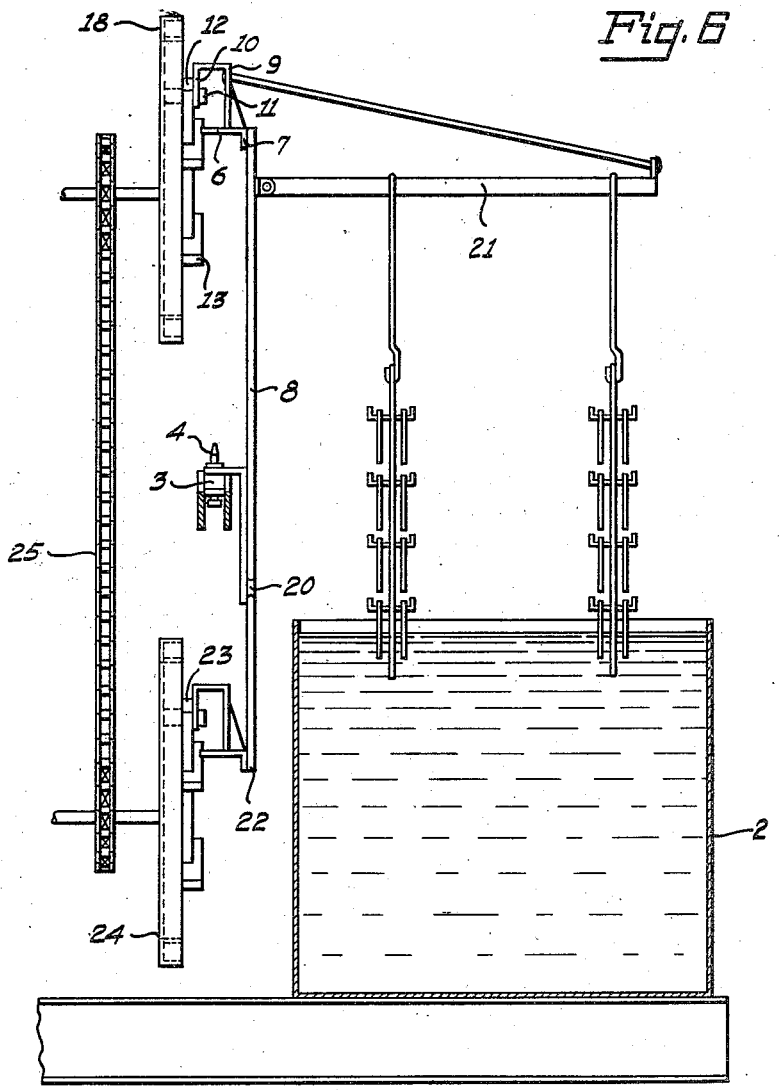

Patented Jan. 10, 1939

2,143,117

UNITED STATES PATENT OFFICE 2,143,117

CONVEYER

Van Winkle Todd, Matawan, N. J., assignor to Hanson-Van Winkle-Munning Company, Matawan, N. J., a corporation of New Jersey Application March 9, 1937, Serial No. 129,874

7 Claims. (Cl. 124—17)

My invention relates to a means and method of conveying work pieces in an electroprocessing machine from one processing tank to another, and of causing the conveyer to move to carry the work pieces through the tanks when they are lowered into the solutions in the tanks.

It is my object to reduce the overall heighth of the conveyer.

In particular, it is the object of my invention to provide a main carrier chain intermittently operated during a portion or part of the transfer cycle, and means of transferring the work piece carrier from one tank to another, and during a portion of such transfer operation, arranging the transfer mechanism to bring about a movement of the main horizontal carrier chain.

It is my object to provide a supplementary carrier transfer means adapted to lift the work piece carrier substantially vertically, transfer it horizontally and lower it substantially vertically, and thereafter return to its initial starting point, without the work piece carrier; and during the first-mentioned horizontal movement when the carrier is in its elevated position, being transferred horizontally from tank to tank to so arrange the transfer mechanism as to actuate the main transfer chain.

It is a further object to provide means by which these movements can be effected by driving the transfer mechanism only, and of moving the main transfer chain during the horizontal movement of the transfer mechanism.

It is a further object to provide means, in one form, by which the work carrier itself is always in engagement with the main carrier chain, but may move vertically and reciprocally with respect thereto, so that when it is moved into its uppermost position, the engagement of the transfer mechanism with it will result in moving the work carrier and the main chain simultaneously.

It is my object to provide a single or double cam guide of generally rectangular shape for the transfer mechanism, with power mechanism associated therewith for effecting the transfer through a cycle and during a portion of the cycle, to move the main carrier chain.

Referring to the drawings:

Figure 1 is a side elevation of the mechanism in which the carrier is reciprocally mounted on the carrier chain, and during a portion of the transfer operation the movement of the carrier is imparted to the chain to give horizontal movement to the chain.

Figure 2 is a similar view showing the use of a transfer chain in the place of a transfer cam.

Figure 5 is a perspective of the rod carrier.

Figure 6 shows the manner in which articles are suspended in the tanks from the work support, of the character illustrated in Figure 1. This view illustrates the relative positions of the upper and lower cam tracks and the tanks.

In Figures 1 and 2 the work support travels with the carrier horizontally and reciprocates vertically. The movement of the work support horizontally carries a chain with it. The overall height of the conveying apparatus is materially reduced which is a marked advantage in being able to install the apparatus in a building with a lower ceiling.

Figure 3:
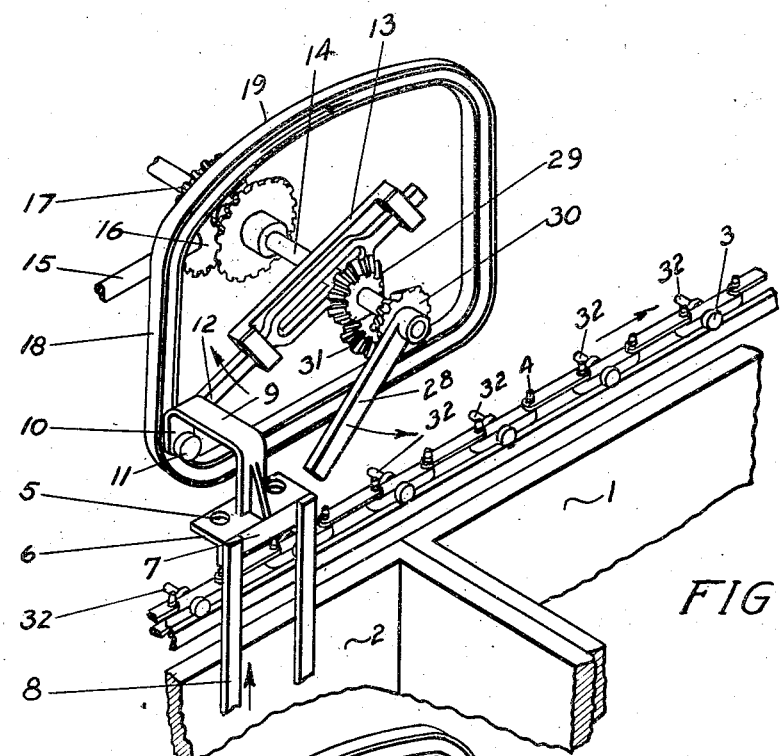
Figure 3 is a perspective of a single transfer cam with a lever engagement with the main carrier chain, the lever being driven from the transfer mechanism.
Figure 4:
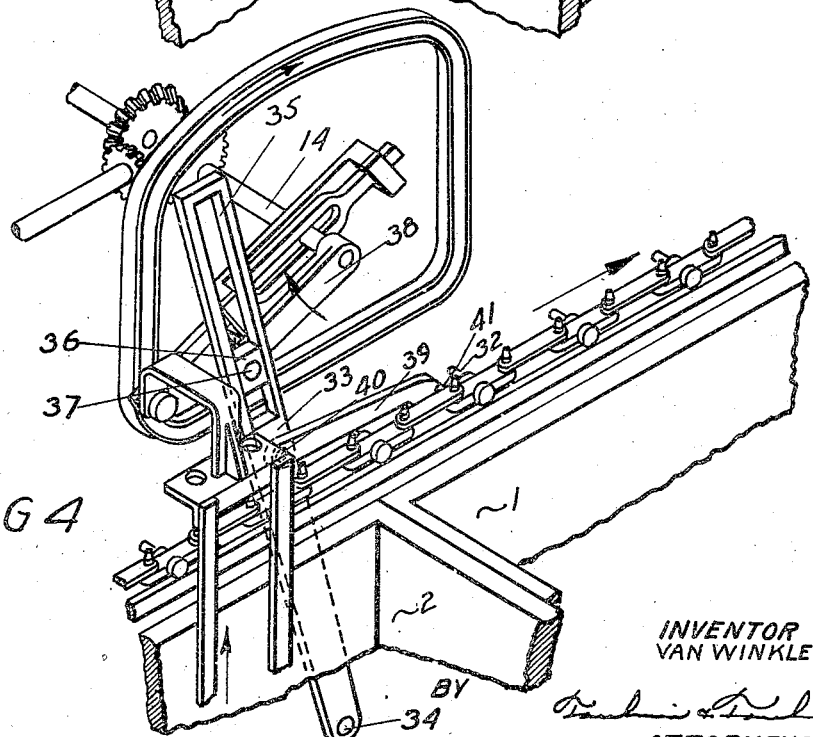
Figure 4 is a similar view showing a modified form of step by step mechanism for intermittently actuating the main carrier chain during the period that the work carrier is being advanced in a horizontal direction during the transfer operation.

In Figures 3 and 4 are shown alternative mechanisms which have the advantage of the lower headroom in which the carrier may be advanced with respect to the chain while at the same time the chain is actuated by the means used to transfer the carrier.

Referring to the drawings in detail, I designates a tank and 2 an adjacent tank. Along the margin of the tanks is arranged a main carrier chain 3, which is provided with a plurality of upstanding studs or pins 4, which are adapted to engage in the apertures 5 of the plates 6, which is a part of the work supporting carrier 7, having members 8 for supporting work pieces. The carrier is preferably provided with a bracket 9 having a slotted head 10 for engaging with the stud 11 on the end of an arm 12 of the transfer mechanism. This arm is mounted reciprocally in a carrier 13 mounted on the driving shaft 14. The driving shaft 14 is driven by the main driving shaft 15 through bevel gears 16 and 17.

The free end of the carrier arm 12 has a pin or roller engaging with the cam trackway 18 which is substantially rectangular in shape. The upper horizontal portion 19 of this camway guides the transfer mechanism from over one tank to the other. In the specific form shown in Figure 1, the depending members 8 are in the shape of rods which engage with side rollers 20. These rollers are mounted on the side plates, which in turn are mounted upon the carrier chain 3.

When the arm 12 lifts the carrier, which has a cantilever arm 21 mounted thereon, the carrier arm moves vertically with respect to the carrier chain 3 without moving the chain.

But upon reaching its maximum upper position upon starting to follow the horizontal course 19 of the cam trackway, then the depending members 8 engage with the rollers 20 on the plate 7 and cause the carrier chain to move horizontally until the transverse movement of the carrier is terminated and it begins to descend.

The lower end of the carrier, as at 22, is connected to a similar arm 23 having a similar cam trackway 24. The two arms 12 and 23 are driven in synchronism through the chain 25 from a common power source such as the shaft 15.

Thus the following movements take place: (a) The carrier is lifted vertically without becoming detached from the chain and without moving the chain; (b) It is then moved horizontally in its uppermost position from over one tank to another, and at the same time the main carrier chain is moved; and (c) And thereafter movement of the main carrier chain ceases during lowering of the carrier arm on to the chain, in engagement therewith once more through the pins 4 being inserted in the apertures 5 of the plate 6.

In the form shown in Figure 2, there are provided sprockets 26 and a chain 27 following a substantially rectangular path, but otherwise the principle of movement is the same.

In Figure 3 the arm 28 is moved in the reverse direction from that of the arm 12, but is driven by the same power shaft 14, through the bevel gears 29 and 30 and the intermediate bevel gear 31. The lower end of the arm 28 engages with the laterally-projecting pin 32 on the carrier chain 3 when the carrier arm 12 begins to move the carrier horizontally along the camway track portion 19.

Referring to Figure 4, it will be noted that the same construction of camway track transfer, arm, and main carrier chain is employed, but there is a difference in the mechanism utilized to forward the main carrier chain in its movement during the horizontal, upper movement of the carrier during transfer.

Referring to Figure 4, a lever 33 is pivoted at 34 to some suitable support on the outside of the tank wall or otherwise. The upper end of this lever is slotted at 35 to form a trackway in which slides a block 36 mounted on a stud 37 upon the end of the arm 38 mounted on the end of the transfer driving shaft 14.

This arm 33 is provided with a pawl 39 fitted on the arm 33 at 40, and having a nose 41 for engaging with the pin 32 on the main carrier chain 3. Thus, when the carrier mechanism commences to move the work supporting carrier horizontally in the uppermost position in order to transfer it from over one tank to over the other tank, simultaneously the pawl 39 is actuated in engagement with the pin 32 of the carrier chain 3 and the chain is moved forward.

It will be understood that I desire to comprehend within my invention such modifications as may be necessary to adapt it to varying conditions and uses.

Having thus fully described my invention, what I claim as new and desire to secure by Letters Patent, is:

1. In an electroprocessing machine, a conveying means, a work support adapted to travel horizontally with said conveying means and adapted to vertically reciprocate on said conveying means, a work support arm mounted on said work support, and a common driving means for vertically reciprocating said work support and through it moving said conveying means horizontally.

2. In an electroprocessing machine, a conveying means, a work support adapted to travel horizontally with said conveying means and adapted to vertically reciprocate on said conveying means, and a work support arm mounted on said work support and means for reciprocating said work support vertically while moving it bodily horizontally with said conveying means, said means being so arranged that it drives said conveying means through said work support as the latter is reciprocated vertically.

3. In an electroprocessing machine, a conveyer chain, a work support mounted thereon and traveling laterally therewith, means to guide said work support in a reciprocal vertical movement on said chain, a transfer arm means adapted to move said work support vertically and horizontally with said chain, and a common driving means adapted to move said work support and conveyer chain simultaneously by actuating the chain through the lateral actuation of the vertically moving work support.

4. In an electroprocessing machine, a conveyer chain, a work support mounted thereon and traveling laterally therewith, means to guide said work support in a reciprocal vertical movement on said chain, and a transfer arm means adapted to move said work support vertically and horizontally with said chain, said transfer arm means comprising synchronously moving upper and lower arms and guide tracks associated therewith for guiding the upper and lower ends of said work supporting means.

5. In an electroprocessing machine, a conveyer chain, a cam track above and below said chain, transfer arms above and below said chain and means interconnecting said arms to cause them to move together, a work support mounted on said conveyer chain to move therewith laterally and to reciprocate thereon vertically and means on the upper and lower ends of said work support for engaging with said cam tracks and with the transfer arms associated therewith whereby said carrier chain and work support will travel together horizontally and said work support may move vertically with respect to said conveyer chain.

6. In an electroprocessing machine, a main carrier chain, a reciprocally mounted work carrier support, adapted to move horizontally with said chain without horizontal displacement with respect to said chain, a transfer mechanism adapted to raise, move horizontally and lower said work support, and to thereby move through the work support the main carrier chain during said horizontal movement.

7. In an electroprocessing machine, a main carrier chain, a reciprocally mounted work carrier support, adapted to move horizontally with said chain, a transfer mechanism adapted to raise, move horizontally and lower said work support, and to thereby move through the work support the main carrier chain during said horizontal movement, said transfer mechanism comprising guiding means at the top and bottom of said work carrier support located above and below the chain and synchronized, actuating means guided thereby and adapted to move vertically said work support and horizontally both the work support and the main carrier chain.

VAN WINKLE TODD.